C. F. NICKERSON.
PROTECTOR FOR PNEUMATIC TIRES.
APPLICATION FILED APR. 9, 1917.
1,253,273. Patented Jan. 15, 1918.
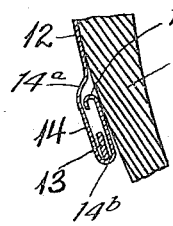
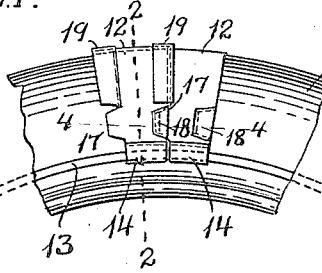
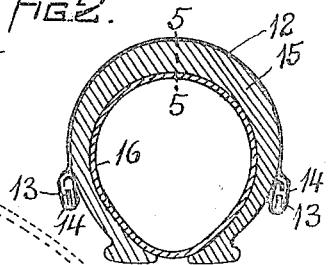
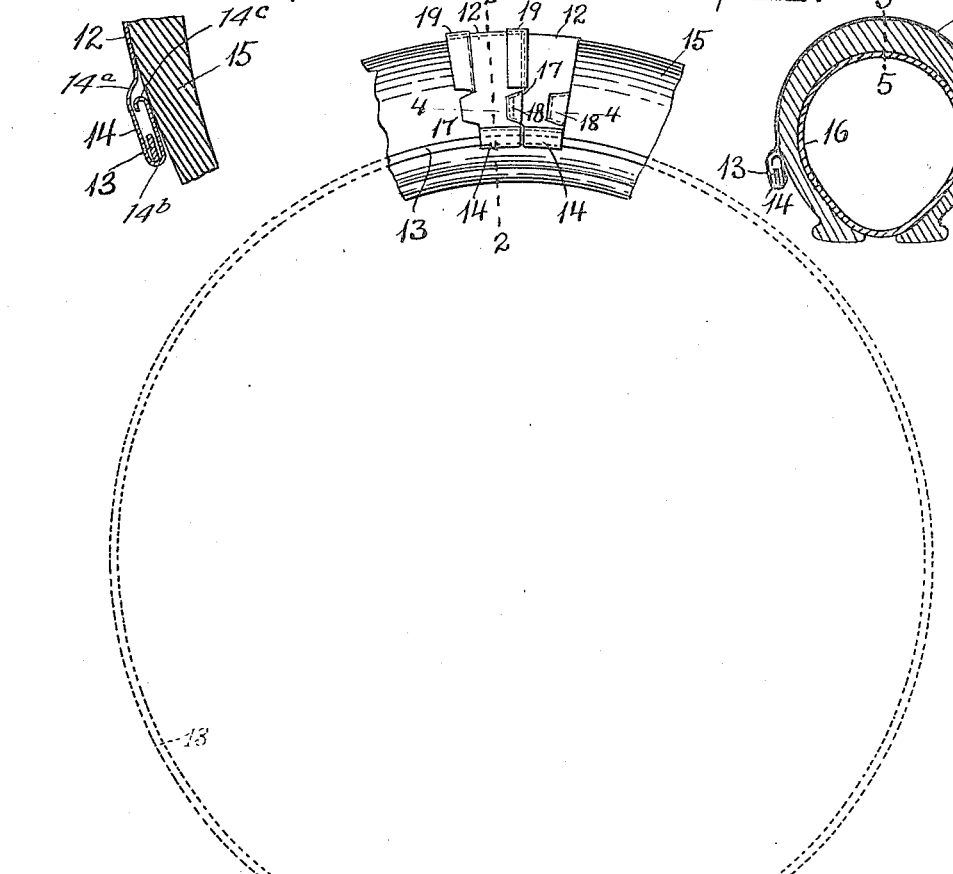
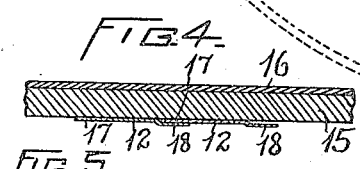
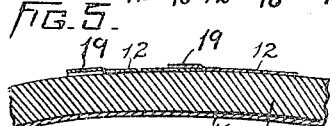
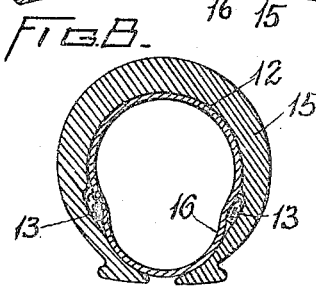
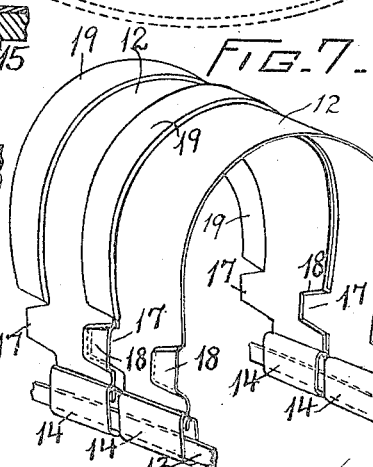
INVENTOR
C. F. Nickerson
by Wright Brown Quimby May
ATTY'S.

UNITED STATES PATENT OFFICE.

CHARLES F. NICKERSON, OF READING, MASSACHUSETTS.

PROTECTOR FOR PNEUMATIC TIRES.

1,253,273.  Specification of Letters Patent.  Patented Jan. 15, 1918.

Application filed April 9, 1917. Serial No. 160,600.

*To all whom it may concern:*

Be it known that I, CHARLES F. NICKERSON, a citizen of the United States, residing at Reading, in the county of Middlesex and State of Massachusetts, have invented new and useful Improvements in Protectors for Pneumatic Tires, of which the following is a specification.

This invention relates to a tire protector composed of a circular series of overlapping arched strips of sheet metal, or other suitable puncture-resisting material, adapted to be applied as an armor to prevent puncturing of the tread portion of the tire.

The invention has for its object to provide an improved construction and arrangement of parts of a protector of this character, whereby the protector may be conveniently applied either to the external surface of a tire shoe, or to the external surface of an inner tube, the series of strips or plates being securely confined and adapted to expand and contract with the tire, so that when the tire is somewhat contracted in consequence of leakage of air from the inner tube, the protector will be correspondingly contracted, and when the tire is fully expanded by inflation of the inner tube the protector will be correspondingly expanded.

The invention consists in the improvements which I will now proceed to describe and claim.

Of the accompanying drawings forming a part of this specification,—

Figure 1 is a side view of a portion of a tire shoe and a portion of a protector embodying my invention applied thereto, the tire being fully expanded by inflation.

Fig. 2 is a section on line 2—2 of Fig. 1.

Fig. 3 is an enlargement of a portion of Fig. 2.

Fig. 4 is a section on line 4—4 of Fig. 1.

Fig. 5 is a section on line 5—5 of Fig. 2.

Fig. 6 is a view similar to a portion of Fig. 1, showing the tire somewhat contracted as a result of leakage of air from the inner tube.

Fig. 7 is a perspective view of a part of the protector.

Fig. 8 is a sectional view, showing the protector interposed between the shoe and inner tube of a pneumatic tire.

The same reference characters indicate the same parts in all of the figures.

My improved protector is formed by assembling a plurality of arched armor strips 12, preferably of sheet metal, on a pair of continuous metal rings 13 which are formed to extend around the sides of a pneumatic tire, the diameter of the ring being smaller than the external diameter of the tire and greater than the internal diameter thereof, as indicated by full and dotted lines in Fig. 1. Each ring may be made by uniting the ends of a narrow strip of steel, or other suitable material, to form a ring, which, while flexible, is not capable of being expanded and contracted.

In forming said loops I provide each strip with transverse outwardly projecting shoulders 14$^a$ (Fig. 3) which are suitably spaced from the ends of the strips, and bend the strip portions between said shoulders and ends to form flat outer loop-sides joining said shoulders, and offset thereby, flexible necks 14$^b$ spaced from the shoulders, and flat inner loop-sides flexibly connected with the outer sides by said necks, said inner sides having free ends 14$^c$ projecting into the recesses formed by the shoulders 14$^a$. The inner sides of the loops are therefore displaceable to permit the engagement of the loops with the rings 13, and said inner sides are arranged to bear on a tire member such as a tire shoe 15, said member confining the inner sides against displacement.

The width of the loops 14 is considerably greater than the width of the rings 13, so that the loops are adapted to play edgewise on the rings, provision being thus made for the expansion with the tire, of the protector formed by the series of strips 12. When the tire is fully expanded the closed inner edges of the loops bear on the inner edge of the ring, as indicated by Figs. 1, 2 and 3. When the tire is somewhat contracted by leakage of air from the inner tube the outer edges of the loops are permitted to bear on the outer edges of the ring, as shown by Fig. 6.

The strips 12 are interlocked and prevented from moving radially independently of each other by tongues 17 formed on one edge of each strip near the loops 14 and sockets 18 formed on the opposite edge of the strip, the sockets 18 of one strip being formed to receive the tongues 17 of the next strip, as shown by Figs. 4 and 7.

Each strip is provided between the tongues 17 with an offset edge portion 19, the offset portion of each strip overlapping the adjacent edge of the next strip, as indicated by Figs. 5 and 7. The strips therefore continuously protect the tread portion of the tire.

The protector above described may be applied to the external surface of the shoe 15, as shown by Figs. 1 to 7, inclusive, or may be interposed between the shoe 15 and inner tube 16, as shown by Fig. 8.

The rings 13 constitute circular ligatures which connect the strips 12 in a circular series, and the loops 14 constitute ligature-engaging means permitting limited radial movements of the strips independently of the ligatures. The construction of the said ligatures and ligature-engaging means may be variously modified without departing from the spirit of the invention.

I claim:

A tire protector comprising a series of arched flexible armor strips each formed from a single piece having at one edge an offset portion shorter than said edge, the opposite edge of said strip being formed to project under the offset edge portion of an adjoining strip, each strip having transverse outwardly projecting shoulders spaced from its ends, the portions of the strips between said shoulders and ends being bent to form flat sided loops, the outer sides of which join said shoulders and are offset outwardly thereby, while the inner sides are connected by flexible necks with the outer sides and have free ends projecting into the recesses formed by said shoulders, and two continuous strip-connecting rings inserted in said loops, the loops being adapted to play edgewise on the rings, while the inner sides of the loops are displaceable to permit the engagement of the loops with the rings and are arranged to be confined by a tire member against displacement.

In testimony whereof I have affixed my signature.

CHARLES F. NICKERSON.

Copies of this patent may be obtained for five cents each, by addressing the "Commissioner of Patents, Washington, D. C."